United States Patent [19]
Newkirk et al.

[11] Patent Number: 5,768,709
[45] Date of Patent: *Jun. 23, 1998

[54] PET THERAPEUTIC MASSAGER GLOVE

[76] Inventors: James C. Newkirk; Donna M. Newkirk, both of 506 E. Fourth St., Apt. 200, Cincinnati, Ohio 45202

[*] Notice: The term of this patent shall not extend beyond the expiration date of Pat. No. 5,572,273.

[21] Appl. No.: 754,994

[22] Filed: Nov. 22, 1996

Related U.S. Application Data

[63] Continuation-in-part of Ser. No. 346,013, Nov. 29, 1994, Pat. No. 5,577,273.

[51] Int. Cl.$^6$ .................................................. A41D 19/00
[52] U.S. Cl. ................................ 2/160; 15/160; 15/227; 119/600; 119/611; 119/612; 601/80
[58] Field of Search ........................... 2/159, 160, 161.4, 2/161.6, 161.7, 161.8; 132/76.4; 604/71, 72, 74, 79, 78, 80; 119/600, 602, 611–614; 15/227, 229.11, 160

[56] References Cited

U.S. PATENT DOCUMENTS

| | | | |
|---|---|---|---|
| 277,173 | 5/1883 | Thompson | 2/161.6 |
| 1,497,035 | 6/1924 | Skoglund | 15/227 |
| 1,783,788 | 12/1930 | Hatchett, Sr. | 15/227 |
| 2,309,710 | 2/1943 | Patterson, Jr. | 2/159 |
| 2,753,583 | 7/1956 | Jepson . | |
| 2,988,049 | 6/1961 | Bean . | |
| 3,107,665 | 10/1963 | Nordgren . | |
| 3,128,472 | 4/1964 | Raney | 15/227 |
| 3,145,691 | 8/1964 | Yates . | |
| 3,155,854 | 11/1964 | Stam . | |
| 3,574,885 | 4/1971 | Jone | 15/227 |
| 3,981,275 | 9/1976 | Schimoler . | |
| 4,083,327 | 4/1978 | Dowdy . | |
| 4,330,120 | 5/1982 | Netti . | |
| 4,779,572 | 10/1988 | Freulon . | |
| 4,893,955 | 1/1990 | Zielinski | 15/227 |
| 5,003,637 | 4/1991 | Lonon . | |
| 5,009,195 | 4/1991 | Damm . | |
| 5,500,956 | 3/1996 | Schulkin et al. | 2/159 |
| 5,524,575 | 6/1996 | Lennon | 15/227 |
| 5,577,273 | 11/1996 | Newkirk, et al. . | |

FOREIGN PATENT DOCUMENTS

| | | | |
|---|---|---|---|
| 2598064 | 11/1987 | France | 2/159 |
| 3507698 | 9/1986 | Germany . | |
| 506700 | 4/1956 | Italy . | |
| 645147 | 10/1950 | United Kingdom . | |
| 2252235 | 8/1992 | United Kingdom . | |

Primary Examiner—Gloria M. Hale
Attorney, Agent, or Firm—Wood, Herron & Evans, LLP

[57] ABSTRACT

A pet therapeutic glove for use with or without a power-operated massager is disclosed for grooming and/or massaging a pet. The glove may be used with a power-operated massager which is inserted into a pocket on the back side of the glove. The glove has openings for fingers and thumb to contact the animal and a palm side with bristles for collecting hair and/or further facilitating massaging and/or grooming the animal.

10 Claims, 2 Drawing Sheets

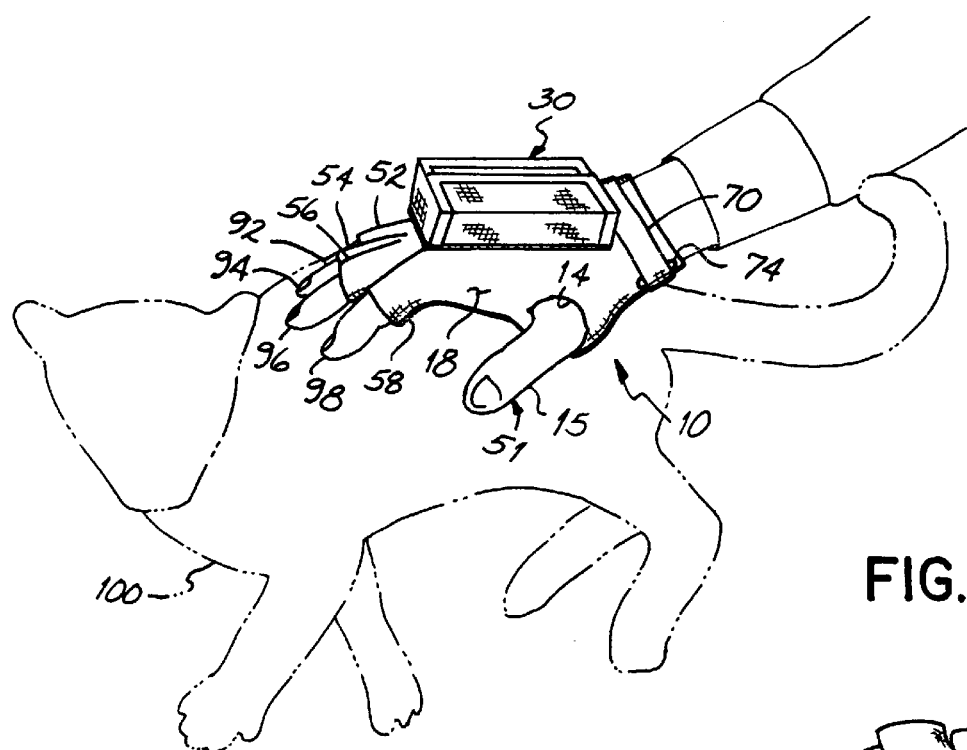
FIG. 4
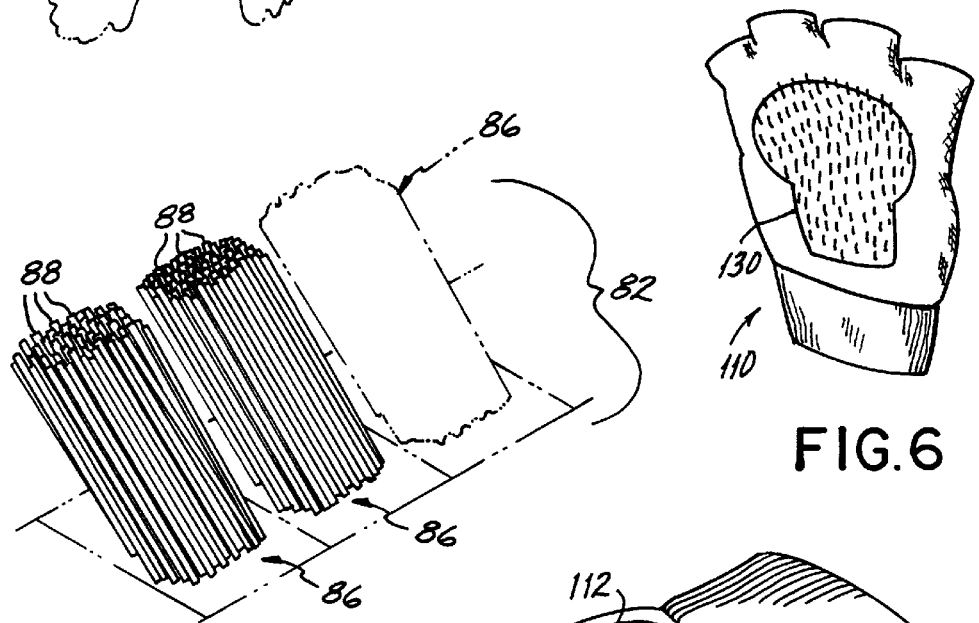
FIG. 3A
FIG. 6
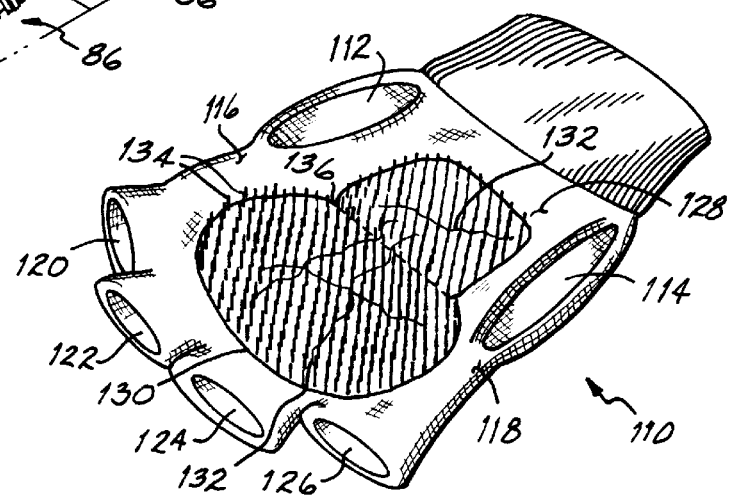
FIG. 5

PET THERAPEUTIC MASSAGER GLOVE

RELATED PATENT APPLICATIONS

The present invention is a continuation-in-part of U.S. patent application Ser. No. 08/346,013 entitled "Pet Therapeutic Massager Glove" filed Nov. 29, 1994, now U.S. Pat. No. 5,577,273.

FIELD OF THE INVENTION

This invention relates generally to a pet therapeutic glove for use both with and without a power operated massager. More particularly, this invention relates to a thumbless glove with open ended finger extensions that is suitable for therapeutically massaging and/or grooming a pet and that may be adapted for use with a power-operated massager located within a pocket on the back side of the glove.

BACKGROUND OF THE INVENTION

Grooming a pet is necessary in order to maintain the pet's health. Many pets fear grooming devices such as a metal, wooden, or plastic brush. The brushes are generally hard and cold with large, hard metal bristles, often placing the pet in discomfort during the grooming process. The pet squirms and attempts to escape during this frightening experience. Grooming devices lack the warm, soothing contact between the groomer and the pet's skin that is needed to keep the pet relaxed for grooming.

Grooming gloves have been described in U.S. Pat. Nos. 277,173 and 2,988,049. These devices, however, employ the use of hard, large bristles attached to the surface of the glove and are more adaptable for use on large animals, like horses. Power-driven grooming devices have been described in patents such as U.S. Pat. Nos. 2,753,583; 4,779,572; 3,145,691; 3,981,275; and 4,083,327. These devices are quite large, some with metal blades and bristles that create fear and discomfort within the animal upon which it is being used. Some of the grooming devices are connected to power-operated suction devices or hair dryers that can be noisy and painful when used upon the animal. Even manually-operated grooming and/or massaging devices also use hard, elongated blades and bristles as described in U.S. Pat. Nos. 4,958,596 and 3,107,665.

Pets are similar to people in that they have a skeletal and muscular system that is subject to aches and pains, too. Unfortunately, the pet cannot explain where it hurts. As massage therapy is good for people's health by increasing blood flow to injured body areas, massage therapy and grooming can be similarly helpful for pets. However, a large, noisy, power-operated device placed directly on a pet's body would frighten most pets as they do not understand the nature of the device being placed upon them. The sight alone of such a device would likely create immediate tension within the pet.

BRIEF SUMMARY OF THE INVENTION

This invention provides a glove for use with or without a power-operated massager comprising a thumbless glove for fitting onto either hand of a user. The glove has a palm side, a back side, finger extensions of the sides, and an opening for receiving a thumb. Alternatively, the glove may have no finger extensions but just openings for receiving a user's fingers. The palm side of the glove has a surface for therapeutically massaging and/or grooming an animal. In one form, the back side of the glove has a pocket for receiving a power-operated massager. The finger extensions if present each have opened ends for receiving finger ends of the user therethrough. These finger ends are in direct contact with the animal to facilitate massaging and/or grooming.

In another form, this invention also provides a thumbless and fingerless glove for fitting onto either hand of a user. The glove has a palm side, a back side and thumb and finger openings for receiving a thumb and fingers of a user. The palm side has a surface comprising bristles for therapeutically massaging and/or grooming an animal. In this alternative embodiment, although this glove is not used with a power-operated massager, it is still used for massaging and grooming.

In other subsidiary aspects of the invention, the pocket of the glove with the power-operated massager has a fastening means for securing the power-operated massager therein. In yet another subsidiary aspect of the glove used with the power-operated massager, a foamed or cushioned material is provided on the back side of the glove beneath the pocket to protect the user's hand from the power-operated massager contained in the pocket. The foamed or cushioned backing also smooths or softens the vibrations to achieve a soothing effect on the animal. In various embodiments of the invention, the power-operated massager can be powered by electricity or battery. In another subsidiary aspect of the invention, the palm side of both gloves has a material surface suitable for collecting hair. Such material may be comprised of plastic bristles similar to those on a hair brush or the material may be comprised of softer bristles such as that which is used on a lint brush. The glove itself is made of an elastic material to readily conform to the shape of a hand and to fit different hand sizes. The glove has a fastening strap to fit around the palm and the back sides of the glove in the area of the user's wrist for securement on the user's hand.

Additional objects, advantages and novel features of the invention will be set forth in part in the description which follows, and others will become apparent to those skilled in the art upon examination of this description or may be learned by practice of the invention. The objects and advantages of the invention may be realized and attained by means of the instrumentalities and combinations particularly pointed out in the appended claims. The preferred embodiment is shown and described simply by way of illustration of the best mode contemplated as carrying out this invention. Accordingly, the figures and description are to be regarded as illustrative in nature and not as restrictive.

BRIEF DESCRIPTION OF THE DRAWINGS

FIG. 3A illustrates a greatly enlarged perspective view of one type of palm side material of the glove.

FIG. 4 illustrates a side perspective view of the glove of FIG. 1 in use on an animal by a user.

FIG. 5 illustrates a perspective side view of a thumbless and fingerless glove for use without a power-operated massager.

FIG. 6 is a perspective view of the glove shown in FIG. 5, illustrating massaging elements provided on the back side of the glove.

DETAILED DESCRIPTION OF THE PREFERRED EMBODIMENT OF THE INVENTION

Figure 1:
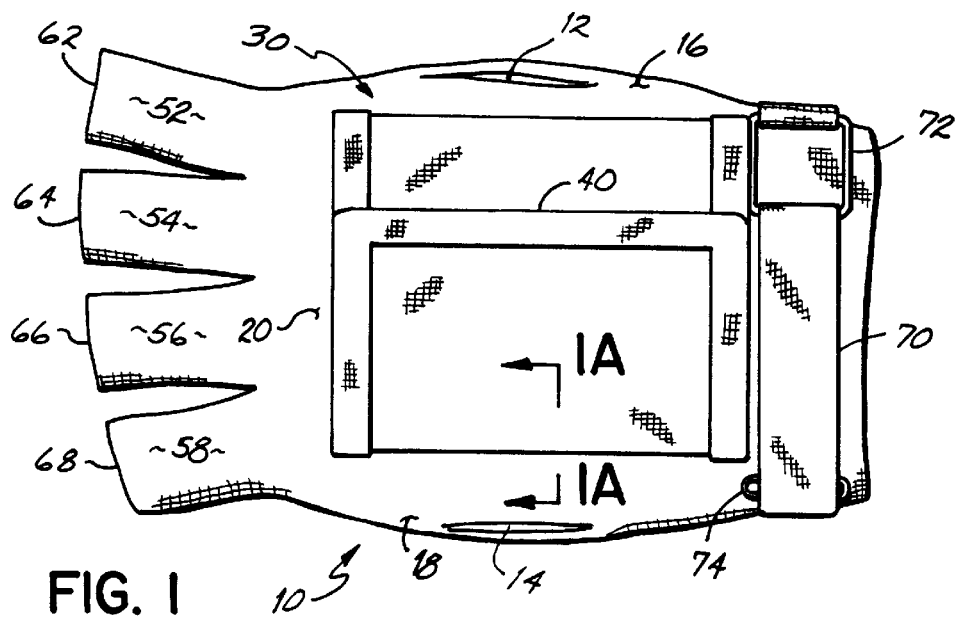
FIG. 1 illustrates a top view of the back side of the therapeutic massaging and/or grooming glove of the present invention.
Figure 1A:
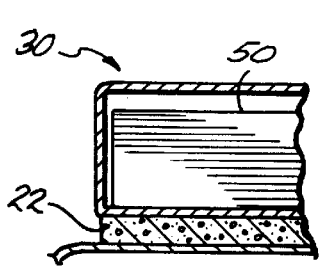
FIG. 1A illustrates a cross sectional view of the back side of the glove of FIG. 1.
Figure 2:
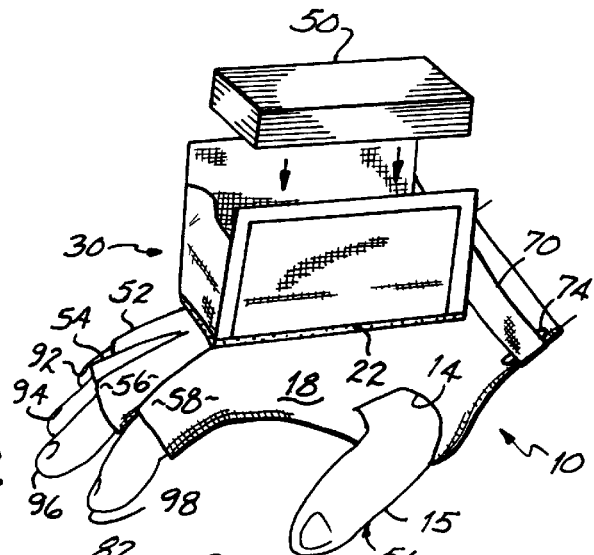
FIG. 2 illustrates a perspective side view of glove of FIG. 1 placed on a hand and power-operated massager being placed in pocket.

With reference to FIGS. 1, 1A and 2, the glove 10 is thumbless as it has openings 12, 14 on both sides 16, 18 of glove 10. Openings 12, 14 are circular and can receive a thumb 15 therethrough. Since openings 12, 14 are located on both sides 16, 18 of glove 10, glove 10 can be used by a right-handed or left-handed user.

The back side 20 of glove 10 has rectangular-shaped foam or a cushion 22 attached thereto. The foam or cushion 22 protects the back side of a user's hand (not shown) from the power-operated massager 50. Furthermore, foam or cushion 22 soothes and softens the vibrations to achieve a soothing effect on the animal. On top of cushion 22 is attached a rectangular-shaped pocket 30.

Pocket 30 has a fastening means 40. Fastening means 40 is preferably hook pile and loop pile material (Velcro), but may be other means such as a zipper, a button or a snap. Fastening means 40 permits pocket 30 to be opened and closed. A power-operated massager 50 can be inserted into pocket 30. Massager 50 is generally rectangular shaped, as is pocket 30. Massager 50 is fully concealed in pocket 30 upon insertion, thus further reducing any fear in the animal that the massager 50 may cause if seen by the animal.

Massager 50 can be secured and enclosed in pocket 30 by fastening means 40 and closing pocket 30. Massager 50 can be powered by battery or electricity. Massager 50 vibrates, thus creating a vibrating movement that is transferred throughout glove 10, and to hand 51. Vibration from massager 50 is transferred to animal when hand 51 is placed on animal. Massager 50 makes a humming noise which is soothing especially to a cat. The direct contact between user and animal, as well as the soothing humming noise of massager 50 makes the device particularly suitable for cats.

Pocket 30, which can be adorned with an animal picture (not shown) uniformly sits upon and attaches to cushion 22 which is preferably a foam material. Cushion 22 protects user's hand 51 from massager 50 contained within pocket 30, and softens the vibrations to achieve a soothing effect on the animal. Cushion 22 is shaped similar to pocket 30, preferably rectangular since massager 50 is preferably rectangular.

Four finger extensions 52, 54, 56, 58 extend from back side 20 of glove 10. Finger extensions 52, 54, 56, 58 have open ends 62, 64, 66, 68 so that the finger ends 92, 94, 96, 98 can be inserted therethrough. Like the thumb 15, finger ends 92, 94, 96, 98 can constantly be in direct contact with the animal. This contact helps create a bond between the user of glove 10 and the animal. This bond relaxes the animal during grooming and/or massaging. Alternatively, glove 10 may have no finger extensions 52, 54, 56, 58, but just openings for receiving a user's fingers.

A wrist fastening strap 70 wraps circumferentially around back side 20 of glove 10 to palm side (see FIG. 3) of glove 10. Fastening strap 70 is preferably comprised of hook pile and loop pile material (Velcro). Two retainers 72, 74 located on sides 16, 18 of glove 10 secure fastening strap 70 as fastening strap 70 is inserted through retainers 72, 74.

Figure 3:
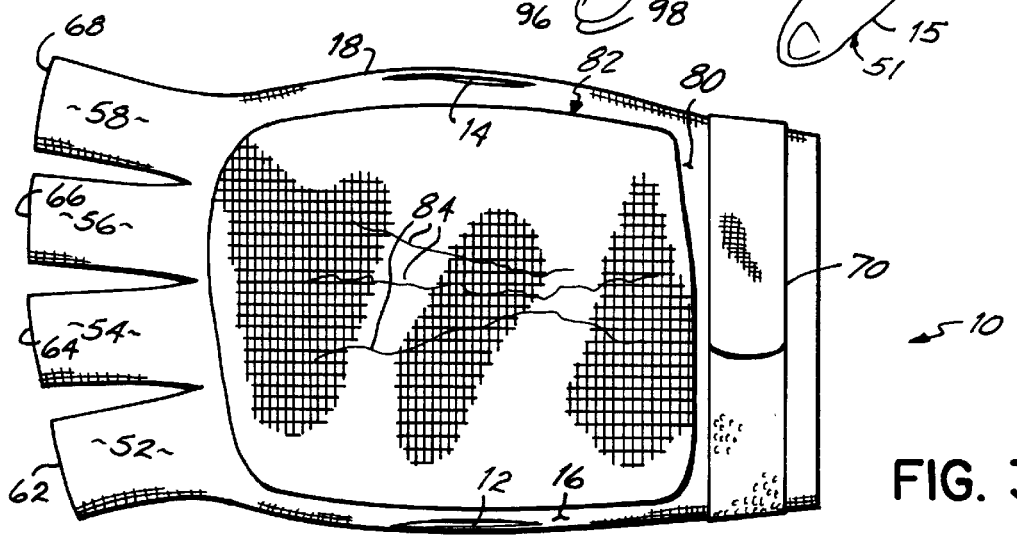
FIG. 3 illustrates a view of the palm side of the glove of FIG. 1.

With reference to FIG. 3 glove 10 has a palm side 80 to which a material 82 for collecting hair is attached. Material 82 covering palm side 80 of glove 10 collects animal hair 84 that an animal sheds while glove 10 is used upon it. As shown in FIG. 3A, palm side material 82 may be comprised of bundles 86 of short, soft bristles 88. Bundles 86 are closely arranged. Bristles 88 collect any hair 84 that is shed. The material 82 is preferably similar to that used on a lint brush, but can be any material with soft bristles suitable for collecting hair. Alternatively, material 82 may be comprised of more firm bristles such as soft plastic bristles to provide a rougher palm side surface, particularly when no power-operated massager 50 is being used in conjunction with glove 10, as shown in FIG. 5. Hair 84 can easily be removed from material 82 by rubbing material 80 to loosen hair 84. Material 82 therefore, may be fairly smooth or comprised of firmer bristles depending on the individual needs of the animal being groomed and/or massaged.

Four finger extensions 52, 54, 56, 58 extend from palm side 80 of glove 10 and have open ends 62, 64, 66, 68 as on back side 20 of glove 10 (see FIG. 1). Fastening strap 70 wraps circumferentially around palm side 80 of glove 10 to back side 20 (see FIG. 1).

FIG. 4 illustrates the massaging and/or grooming glove in use on an animal. Glove 10 is placed on a hand 51. Fastening strap 70 secures glove 10. Thumb 15 extends through opening 14 and is free to move. Finger ends 92, 94, 96, 98 extend through finger extensions 52, 54, 56, 58 and out through open ends 62, 64, 66, 68 such that finger ends 92, 94, 96, 98 are not contained within glove 10 so as to permit the user to directly touch the animal 100 during the grooming and/or massaging process. Direct contact with animal 100 helps maintain calmness within animal 100 during grooming and massaging.

FIG. 5 illustrates the use of a fingerless and thumbless glove 110 for use without a power-operated massager. In this form, no pocket is needed. Glove 110 is provided with thumb openings 112, 114 on both sides 116, 118 of glove 110. Since openings 112, 114 are located on both sides 116, 118 of glove 110, glove 110 can be used by a right-handed or left-handed user. Glove 110 also has finger openings 120, 122, 124, 126 for receiving respective fingers (not shown) of a user.

Palm side 128 of glove 110 is provided with a plastic pad 130 of massaging elements attached thereto for collecting hair 132 and for further facilitating massaging and/or grooming of the animal. Since no pocket is needed on the backside of the glove, another pad or other massaging elements may be provided for use on the backside of the glove as shown in FIG. 6. Plastic pad 130 is comprised of a flat base and a multitude (about 200 to 400) of formed plastic bristles 134 therein of about ¼ to ½ inch in length and about ¹⁄₁₆ to ¹⁄₃₂ inch in diameter uniformly spaced apart by about ¹⁄₁₆ inch on palm side 128 of glove 110. Plastic bristles 134 of polyethylene or polypropylene provide a more invigorating massage as compared to the bristles contained on a lint brush, which may be desirable especially when a power-operated massager is not being used in conjunction with glove 110. Plastic pad 130 is hinged as at 136 to provide flexibility to the glove thereby facilitating the quality of the massaging and/or grooming. Like glove 10 with power operated massager 50, glove 110 permits the user's thumb and fingers (not shown) to be in direct contact with the animal during the massaging and/or grooming process.

By virtue of the foregoing, there is thus provided a therapeutic pet massager and/or grooming device for use on a pet, preferably a cat or dog. While the present invention has been illustrated by the description of embodiments thereof, and while the embodiments have been described in considerable detail, it is not the intention of the applicants to restrict or in any way limit the scope of the appended claims. Additional advantages and modifications will readily appear to those skilled in the art. The invention in its broader aspect is, therefore, not limited to the specific details and illustrative examples shown and described. Departures may be made from such details without departing from the spirit or scope of applicant's general inventive concept.

What is claimed is:

1. A device for massaging and/or grooming an animal comprising a thumbless glove for fitting onto either hand of a user, said glove having a palm side, a back side, a plurality of openings between said sides for receiving the fingers and a pair of openings between said sides for receiving a thumb of either hand, said palm side having a surface comprising a plurality of massaging elements for therapeutically massaging and/or grooming an animal, said openings enabling the fingers and thumb of the user to be in contact with the animal.

2. The device of claim 1 wherein said elements are comprised of plastic bristles.

3. The device of claim 2 wherein said plastic bristles are formed in a plastic pad and extend about ¼ to about ½ inch in length and have diameters of about 1/16 to about 1/32 inch.

4. The device of claim 2 wherein said plastic bristles extend from a plastic pad and the pad is hinged to provide flexibility to the glove and thereby facilitate massaging and/or grooming.

5. The device of claim 1 wherein said glove is comprised of an elastic material to conform to the shape of a hand.

6. The device of claim 1 having a wrist fastening strap around said glove sides for securing said glove to a user's wrist.

7. The device of claim 1 having massaging elements on the back side of the glove.

8. A device for massaging and/or grooming an animal comprising a thumbless and fingerless glove for fitting onto either hand of the user, said glove having a palm side, a back side, and finger extensions having open ends for receiving fingers and an opening on each side of the palm side for receiving a thumb of either hand, said palm side having a surface comprising a multiple of plastic bristles extending substantially completely over the palm side, said open ends and opening enabling the fingers and thumb of the user to be in contact with the animal.

9. The device of claim 8 wherein said glove is made of fabric and the bristles extend from a plastic base pad which is secured to the fabric on the palm side.

10. The device of claim 9 wherein said fabric is elastic.

* * * * *